United States Patent [19]

Conti

[11] Patent Number: 4,596,397
[45] Date of Patent: Jun. 24, 1986

[54] MOBILE DEVICE

[76] Inventor: Laura J. Conti, 1321 Parkway Dr., Yuma, Ariz. 85367

[21] Appl. No.: 722,966

[22] Filed: Apr. 12, 1985

[51] Int. Cl.⁴ .............................................. B62B 1/00
[52] U.S. Cl. ...................... 280/47.13 R; 280/79.1 A; 280/DIG. 3; 190/18 A; 248/98; 383/13; 383/71
[58] Field of Search .................. 280/47.13 R, DIG. 3, 280/79.1 A, 659; 190/18 A; 383/13, 25, 71; 248/98

[56] References Cited

U.S. PATENT DOCUMENTS 2,610,071  9/1952  Davis et al. ................. 280/DIG. 3
2,981,990  5/1961  Balderree, Jr. ...................... 383/71
3,418,005 12/1968  Allina ................... 280/659
3,495,763  2/1970  Schmidt et al. ........................ 383/13
4,112,541  9/1978  Tetradis ................................ 383/13

Primary Examiner—John J. Love
Assistant Examiner—Richard Camby
Attorney, Agent, or Firm—Richard R. Mybeck

[57] ABSTRACT

A collapsible mobile device for shoppers having a wheeled base assembly, a plastic bag member detachably secured to the wheeled base assembly and extendible upwardly therefrom, and a handle device circumscribing the plastic bag member in locking relationship thereto for moving the bag on the wheeled base assembly.

8 Claims, 7 Drawing Figures

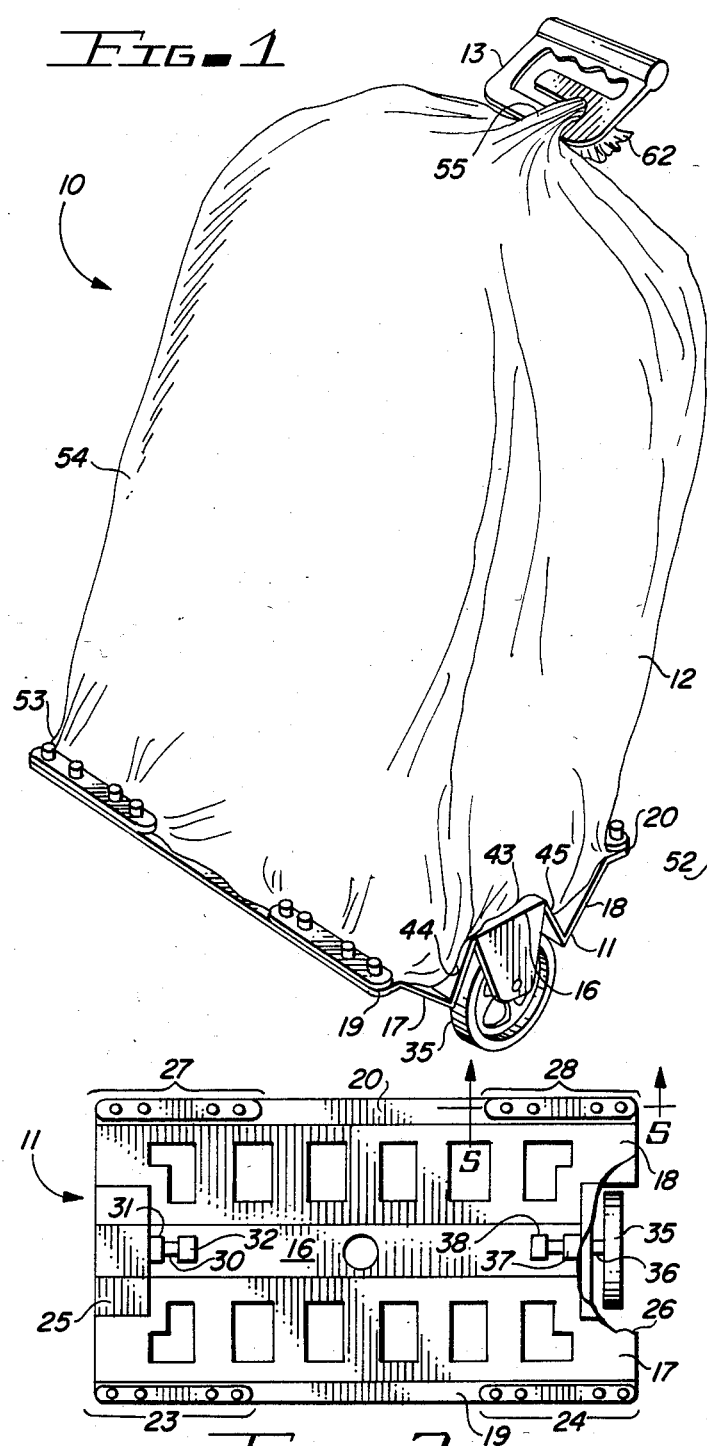
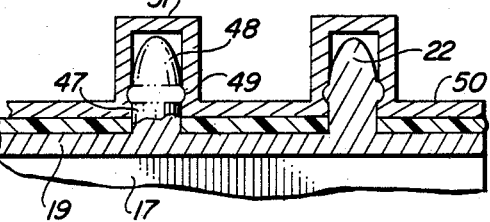
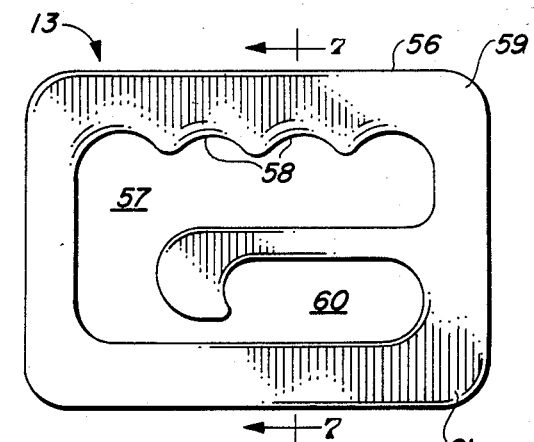
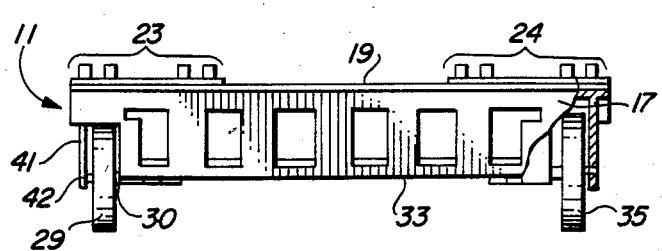
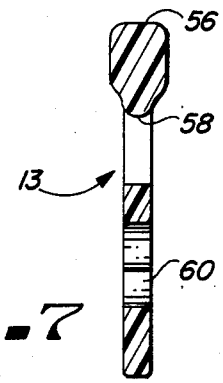

MOBILE DEVICE

INTRODUCTION

The present invention relates to a mobile device for shoppers and more particularly to a portable cart having a base member which can be readily connected to and combined with a so-called plastic trash bag to create a mobile convenience capable of accumulating, holding and transporting a plurality of parcels for the active shopper as he or she traverses the lengthy corridors of today's modern malls.

BACKGROUND OF INVENTION

The problem confronting the busy shopper who acquires more packages than he/she can reasonably expect to carry is not unique and several solutions have heretofore been proposed with varying degrees of success.

The most well known solution is the so-called grocery cart in which a large wire basket is integrally secured to a four wheeled carriage for movement along the aisles of large grocery or general merchandise shops, preparatory to entering a checkout line. Such carts, because of the size and expense, are usually owned by the merchant providing them and are to be used only on the premises of that merchant. Further, such carts are deliberately rendered non-collapsible because such a feature would only compound the problem of cart theft which is already a major headache to the industry.

Another solution was developed comprising a vertically elongated wire basket mounted upon a pair of wheels and drawn by handle means rigidly formed therewith and extending therefrom.

Such carts, while providing a partial solution to the needs of a shopper moving from store to store, were severely restricted both with respect to the number as well as the size of package it could stow and could not be transported easily because of the space required to hold it.

Consequently, a need still exists for a shopper's transport which can be readily assembled for use, easily collapsed for transport, and which, when assembled can accept and maintain a great number of packages of any wide variety of sizes without impairing either its mobility or its convenience.

SUMMARY OF INVENTION

The present invention comprises a portable wheeled base member which can be readily associated with a common plastic trash bag and an auxiliary handle to provide a mobile device for receiving, storing and transporting a shopper's parcels during a trip through a modern mall or like shopping excursion.

When not in use, the device folds into a compact, light weight readily transported member which can be readily placed in the trunk of a motor vehicle or like storage space.

Accordingly, the principal object of the present invention is to provide a mobile device for shoppers which fulfills the aforestated need in a highly convenient and relatively inexpensive fashion.

These and still further objects as shall hereinafter appear are fulfilled by the present invention in a remarkably unexpected fashion as will be readily discerned from the following detailed description hereof, especially when read in conjunction with the accompanying drawing.

BRIEF DESCRIPTION OF DRAWINGS

Referring to the drawings in which like parts bear like indicia throughout the several views, FIG. 1 is an isometric showing of a mobile device embodying the present invention;

FIG. 2 is a plan elevation, partially broken away, of a base member embodying the present invention;

FIG. 3 is a front elevation, partially broken away, of the base member of FIG. 2;

FIG. 4 is an exploded fragmented view of a clamping arrangement embodying the present invention;

FIG. 5 is a cross-sectional view taken along line 5—5 of FIG. 2.

FIG. 6 is a plan elevation of a handle means embodying the present invention; and FIG. 7 is a cross-sectional view taken along line 7—7 of FIG. 6.

DESCRIPTION OF PREFERRED EMBODIMENT

Referring to FIG. 1, a mobile device 10 embodying the present invention is identified by the general reference 10 and comprises a base assembly 11, a bag member 12 secured to said base assembly 11 and a handle means 13 coacting with said bag member 12 to impart motive force to said base assembly 11.

Referring to FIGS. 2 and 3, base assembly 11 comprises an intermediate central portion 16 having a front wing portion 17, and a rear wing portion 18 angularly disposed relative thereto and extending upwardly and outwardly therefrom to a contiguous outreaching horizontal flange portion 19, 20, respectively.

Each flange portion, for example flange portion 19, is provided with a plurality of upstanding pin members 22 integrally formed therewith, with a first group disposed adjacent one side 25 thereof (left side, relative to FIGS. 2 and 3) and a second group 24 disposed adjacent the other side 26 thereof (right side, Ibid). Flange portion 20 is likewise provided with a first group 27 of upstanding pin members integrally formed therewith and disposed adjacent side 25 thereof and a second group 28 of like pins disposed adjacent side 26 thereof.

A first wheel member 29 is mounted upon a first axle 30 which is supported by first and second axle support brackets 31, 32 secured to the undersurface 33 of central portion 16 adjacent end 25. A second wheel member 35 is mounted upon a second axle 36 which is supported by first and second axle support brackets 37, 38 secured to the undersurface 33 of central portion 16 adjacent end 26.

A fender-like wheel cover 41 is integrally formed with base assembly 11 and depends therefrom outwardly of wheel member 29 to support the distal end 42 of axle 30 therewithin. In the preferred embodiment as shown in FIGS. 1 and 2, each wheel cover 41 comprises a flat upper surface 43, downwardly sloping flat front surface 44 and a downwardly sloping flat rear surface 45. The triparte wheel cover 41 can, if desired, be shaped to provide a continuous curvilinear contour.

Referring to FIGS. 4 and 5, each of the several pin members 22 comprises a cylindrical base portion 47 and a tapered top portion 48 having an intermediate welt or collar portion 49 interposed therebetween which, as will hereafter appear, coacts with complementary latching means to lock the pin therewithin.

Each group of pin members, such as group 23, has an elongated latch member 50 operatively associated therewith. Each latch member 50 has a plurality of complementary receptacles 51 defined therealong so that each receptacle 51 is positioned for operable registry with a different one of said pin members 22 to enable the latch member 50 to be seated thereupon and locked therewith to secure a fold 52 of bag member 12 therebetween.

Bag member 12 is formed of 5 to 10 mil high density polyethylene or like plastic and is secured to base member 11 by inserting a corresponding fold 52 thereof between each of said latch members 50 and the coacting group of pins in registry with the receptacles thereof.

Pin members 22 such as group 23 may penetrate the corresponding fold 52 of bag member 12 or not, depending upon the thickness of the bag 12 selected, without creating any major difference in the overall assembly or operation of device 10.

Optionally, the bottom portion 53 of bag member 12 which is placed in registry with central portion 16 of base member 11, may be cemented thereto using methyl ethyl ketone or an equivalent adhesive/solvent.

Referring to FIGS. 6 and 7, handle member 13 may be molded from an appropriate shock resistant plastic such as polystyrene, polyvinyl chloride or the like to have a generally rectangular perimeter 56 in which a G-shaped opening 57 is defined therethrough to provide a hand grip 58 at the leading portion 59 thereof and a bag lock 60 at the trailing portion 61 thereof for use as will be hereafter described.

Base member 11 may either be created as an integral structure as shown or wing portions 17, 18 may be hinged (not shown) to central portion 16 to permit folding into an even more compact package when the device 10 is not in use.

When use is desired, the base member 11 is withdrawn from storage and the angular relationship of wing portions 17, 18 to central portion 16 is established, as when optional hinges are used, or the base member 11 is set upon the ground when the integral structure is employed.

A suitable bag member 12, for example a 10 mil, 30 gallon trash bag, is placed within base member 11 and smoothed to fit. A tuck or fold 52 is formed above both the leading flange 19 and the trailing flange 20 and laid over the upstanding pin members 22. The several corresponding latch members 50 are then snapped into place over the respective groups of pin members 23, 24, 27, 28 to secure bag member 12 to base member 11. The body 54 and neck 55 of bag member 12 are then drawn upwardly from base member 11 and the neck 55 is reeved through opening 57 in handle member 13 to a locking position within bag lock 60 at the trailing edge 61 thereof.

Device 10 is then capable of being rolled throughout a shopping mall and the like by simply gripping hand grip 68 and walking. Each time it is desired to add a new parcel to the bag 12, neck 55 of bag member 12 is removed from bag lock 60 and handle means 13 and neck 55 opened to provide an entryway or mouth 62 into the bag 12. The locking and opening procedure is thereafter repeated as often as necessary to fulfill the shopper's needs.

From the foregoing, it is apparent that a mobile device has been herein described and illustrated which fulfills all of the aforestated objectives in a remarkably unexpected manner. It is of course understood that such modifications, alterations and adaptations as may readily occur to the artisan confronted with this disclosures are intended within the spirit of this disclosure which is limited only by the scope of the claims appended hereto.

What is claimed is:

1. A mobile device comprising a wheeled base assembly; a plastic bag member detachably secured to said base assembly; and handle means circumscribing said plastic bag in locking relationship thereto, said base assembly having a central portion with a front edge and a rear edge, a front wing portion attached to said front edge of said central portion and extending angularly upwardly therefrom, a rear wing portion attached to said rear edge of said central portion and extending angularly upwardly therefrom, a first horizontal flange member extending outwardly from said front wing portion, and a second horizontal flange member extending outwardly from said rear wing portion, each of said flange portions including means for detachably securing said bag member to said base assembly.

2. A mobile device according to claim 1 in which said securing means comprises a plurality of grouped pin members extending upwardly from each of said flange members and a plurality of latch members, one associated with each group of said pin members and coacting therewith to secure a portion of said bag member therebetween.

3. A mobile device according to claim 2 in which each of said pin members in each of said groups comprising a cylindrical body portion, a tapered nose portion and a circumscribing collar portion operatively interposed between said body portion and said nose portion.

4. A mobile device according to claim 3 in which each said latch means comprises an elongated body portion having a plurality of openings defined therein in spaced cooperative registry to each of said pin members in said groups.

5. A mobile device according to claim 1 in which said securing means comprises a plurality of grouped pin members extending upwardly from each of said flange members and a plurality of latch members, one associated with each group of said pin members and coacting therewith to secure a portion of said bag member therebetween.

6. A mobile device according to claim 5 in which each of said pin members in each of said groups comprises a cylindrical body portion, a tapered nose portion and a circumscribing collar portion operatively interposed between said body portion and said nose portion.

7. A mobile device according to claim 6 in which each said latch means comprises an elongated body portion having a plurality of openings defined therein in spaced cooperative registry to each of said pin members in said group.

8. A device according to claim 1 in which said handle means comprises a generally rectangular body portion having a leading portion and a trailing portion, said leading portion having finger receiving means defined therethrough; said trailing portion having means for receiving and locking a portion of said bag member therewithin.

* * * * *